US012700588B2

(12) United States Patent
Nguyen et al.

(10) Patent No.: US 12,700,588 B2
(45) Date of Patent: Aug. 4, 2026

(54) CATHODE ACTIVE MATERIAL COATED WITH LITHIUM BORATE DOPED LITHIUM CARBONATE AND SULFIDE ALL-SOLID-STATE BATTERY COMPRISING SAME

(71) Applicant: Factorial Inc., Woburn, MA (US)

(72) Inventors: Minh Nguyen, Lowell, MA (US); Fang Hao, Andover, MA (US); Joanna Burdynska, Woburn, MA (US)

(73) Assignee: Factorial Inc., Billerica, MA (US)

( * ) Notice: Subject to any disclaimer, the term of this patent is extended or adjusted under 35 U.S.C. 154(b) by 7 days.

(21) Appl. No.: 18/194,145

(22) Filed: Mar. 31, 2023

(65) Prior Publication Data

US 2024/0186498 A1 Jun. 6, 2024

Related U.S. Application Data

(60) Provisional application No. 63/386,183, filed on Dec. 6, 2022.

(51) Int. Cl.
| | |
|---|---|
| *H01M 4/485* | (2010.01) |
| *C01G 53/42* | (2025.01) |
| *H01M 4/02* | (2006.01) |
| *H01M 4/131* | (2010.01) |
| *H01M 4/36* | (2006.01) |

(Continued)

(52) U.S. Cl.
CPC ............ *H01M 4/485* (2013.01); *C01G 53/42* (2013.01); *H01M 4/131* (2013.01); *H01M 4/366* (2013.01); *H01M 4/525* (2013.01); *H01M 10/0562* (2013.01); *C01P 2002/54*

(2013.01); *C01P 2002/88* (2013.01); *C01P 2004/80* (2013.01); *C01P 2006/40* (2013.01); *H01M 2004/028* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 7,534,519 B2 | 5/2009 | Cable et al. | |
| 7,993,782 B2 | 8/2011 | Takada et al. | |

(Continued)

FOREIGN PATENT DOCUMENTS

| | | | | | |
|---|---|---|---|---|---|
| CN | 106848183 A | * | 6/2017 | .............. | H01M 4/04 |
| WO | WO-2022198843 A1 | * | 9/2022 | | |

OTHER PUBLICATIONS

Jung, et al. Li3BO3—Li2CO3: Rationally Designed Buffering Phase for Sulfide All-Solid-State Li-Ion Batteries, Chem. Mater. 2018, 30, 22, 8190-8200 (Year: 2018).*

(Continued)

*Primary Examiner* — Jonathan G Leong
*Assistant Examiner* — Claire A Rutiser
(74) *Attorney, Agent, or Firm* — Fish & Richardson P.C.

(57) ABSTRACT

Disclosed are cathode active material (CAM) coated with a lithium carbonate doped with lithium borate with a formula of $Li_{2+x}C_{1-x}B_xO_3$ wherein $0<x<0.5$ and a preparation method therefor. Also disclosed is a cathode layer comprising the coated CAM in the form of particles. In one embodiment, an all-solid-state battery comprising the cathode layer exhibits improved stability and cycling performance.

28 Claims, 5 Drawing Sheets

(51) Int. Cl.
    *H01M 4/525*       (2010.01)
    *H01M 10/0562*    (2010.01)

(56)           References Cited

U.S. PATENT DOCUMENTS

| | | | |
|---|---|---|---|
| 8,877,377 | B2 | 11/2014 | Hosoya |
| 9,214,674 | B2 | 12/2015 | Yoshida |
| 10,566,611 | B2 | 2/2020 | Allie et al. |
| 10,615,451 | B2 | 4/2020 | Yamamoto et al. |
| 10,930,927 | B2 | 2/2021 | Miara et al. |
| 2006/0093914 | A1* | 5/2006 | Tanaka ................... C01G 53/54 |
| | | | 429/223 |
| 2011/0045348 | A1 | 2/2011 | Kubo et al. |
| 2014/0370346 | A1* | 12/2014 | Okumura .............. H01M 4/505 |
| | | | 429/94 |
| 2017/0179472 | A1* | 6/2017 | Allie ................... H01M 10/052 |
| 2018/0375150 | A1* | 12/2018 | Yamamoto ............. G04C 10/00 |
| 2019/0131615 | A1* | 5/2019 | Yokoyama ........... H01M 4/049 |
| 2019/0372102 | A1 | 12/2019 | Miki |
| 2020/0028208 | A1* | 1/2020 | Dasgupta .......... H01M 10/0585 |
| 2020/0185709 | A1 | 6/2020 | Zhou et al. |
| 2021/0265623 | A1 | 8/2021 | Tsujimura et al. |
| 2021/0376310 | A1 | 12/2021 | Dasgupta et al. |
| 2022/0013781 | A1 | 1/2022 | Choi et al. |
| 2022/0231325 | A1* | 7/2022 | Jung ..................... H01M 4/382 |

OTHER PUBLICATIONS

Shannon et. al, New Li solid electrolytes, Electrochemica Acta vol. 22, Issue 7, Jul. 1977, pp. 783-796. Figure 18 shows ionic conductivity isotherms for LCBO. (Year: 1977).*
Kaur, G., & Gates, B. D. (2022). Surface Coatings for Cathodes in Lithium Ion Batteries: From Crystal Structures to Electrochemical Performance. Journal of the Electrochemical Society, 169(4), 043504. (Year: 2022).*
WO-2022198843-A1 (Chen) translation from Espacenet (Year: 2021).*
CN-106848183-A English translation from Espacenet (Year: 2017).*
Zhang, et al. Direct Visualization of the Interfacial Degradation of Cathode Coatings in Solid State Batteries: A Combined Experimental and Computational Study, Adv. Energy Mater. 2020, 10, 1903778.
Zhang, et al. Achieving Both High Ionic Conductivity and High Interfacial Stability with the Li2+xC1—xBxO3 Solid-State Electrolyte: Design from Theoretical Calculations. ACS Appl. Mater. Interfaces 2020, 12, 5, 6007-6014.
Jung, et al. Li3BO3—Li2CO3: Rationally Designed Buffering Phase for Sulfide All-Solid-State Li-Ion Batteries, Chem. Mater. 2018, 30, 22, 8190-8200.
Kaurz G and Gates BD, Review—Surface Coatings for Cathodes in Lithium Ion Batteries: From Crystal Structures to Electrochemical Performance. Journal of the Electrochemical Society, 2022 169 043504.
Shannon et. al, New Li solid electrolytes, Electrochemica Acta, 1977, 22 (7): 783-796.

* cited by examiner

Figure 7

CATHODE ACTIVE MATERIAL COATED WITH LITHIUM BORATE DOPED LITHIUM CARBONATE AND SULFIDE ALL-SOLID-STATE BATTERY COMPRISING SAME

CROSS-REFERENCE

This application claims the benefit of U.S. Appl. No. 63/386,183 filed on Dec. 6, 2022, the entire contents of which is hereby incorporated by reference in its entirety.

FIELD

The present disclosure relates to cathode active material coated with lithium carbonate borate and a sulfide-based all-solid-state battery (ASSB) comprising the same.

BACKGROUND

All-solid-state batteries (ASSBs) are considered as promising candidates for future energy storage devices as they may enable the use of lithium metal as anode material and lead to higher specific energies compared to conventional lithium-ion batteries based on organic liquid electrolytes. Sulfide solid electrolyte (SE) materials comprise element the sulfur in the −2 oxidation state ($S^{-2}$) and have narrow intrinsic electrochemical windows. Thiophosphate-based solid electrolytes (SEs) contain elements phosphorus (P) and sulfur (S) and are particularly promising because of their high ionic conductivities, good mechanical compatibility, and relatively low costs. The passivation of SEs is necessary for the reversible operation of all-solid-state batteries. In particular, the adaptation of conventional high-capacity cathode active materials (CAMs) such as lithium metal oxide CAMs (ex. $LiNi_{0.88}Co_{0.09}Al_{0.03}O_2$—NCA88) to ASSBs suffer from interfacial resistances. The interfacial resistances are attributed to multiple factors such as surface impurities on the CAM surface, severe reactions between the lithium metal oxide and sulfide SEs, space charge layer effects, lattice mismatches, and poor wetting of SEs. It is known that the formation of surface impurities, such as LiOH and $Li_2CO_3$ on CAM surface in ambient atmosphere conditions, causes the degradation of the electrochemical performances of conventional LIBs. When it comes to ASSBs, the S/O exchange at the CAM/SE interface and the poor ion-conducting properties of the surface impurities are of major concern. The computational modeling by Zhang et al[1] reported that the $Li^+$ conductivity in crystalline $Li_2CO_3$ is ~$10^{-10}$ S cm$^{-1}$ at room temperature and may lead to a high interfacial resistance.

Various protective coatings have been developed to lower the interfacial resistance. $LiNbO_3$ is one of the most studied coating materials for sulfide ASSBs because of its high $Li^+$ conductivity of ~$10^{-6}$ S cm$^{-1}$. US20110045348A1 discloses that a $LiNbO_3$ layer coating on CAM could reduce the interfacial resistance.

However, such coating materials may not fully address the challenges. Zhang et al.[2] reported that the transition metal may diffuse from the CAM to the thin film coating. First-principles computation also indicates that the high binding energy of a $PO_4$ group creates a driving force for S/O exchange between the oxygen atoms in the coating of lithium transition metal oxide such as $LiNbO_3$ and $LiTaO_3$ and the S atoms in the sulfide SEs. In addition, the relatively low oxidation limit of these ternary-metal-oxide coatings raises concern for their stability at high voltages. Thus, there remains a need for additional coating materials and all solid-state batteries comprising the same.

SUMMARY

Disclosed herein is cathode active material (CAM) at least partially coated with a lithium carbonate doped with lithium borate with a formula of $Li_{2+x}C_{1-x}B_xO_3$ wherein $0<x<0.5$ and a preparation method therefor. Also disclosed is a cathode layer comprising the coated CAM and an all-solid-state battery comprising the cathode layer. The CAM disclosed herein with the recited lithium carbonate doped with lithium borate improves the discharge specific capacity and/or the cycle-life stability when incorporated into an all-solid-state battery. In another aspect, also disclosed herein is a CAM with its surface doped with lithium borate.

BRIEF DESCRIPTION OF THE FIGURES

FIG. 7 shows a plot of specific capacity vs. cycle at 75° C. of half-cells comprising a Li metal anode, LPSCl ($Li_6PS_5Cl$) SE, and a cathode layer comprising particles of NCA88 as CAM, and VGCF. Cycle 1 & 2 were cycled at 0.1 C charge/discharge; cycle 3 & 4 were cycled at 0.33 C charge/discharge, cycle 5 & 6 were cycled at 0.5 C charge/discharge; cycle 7 & 8 were cycled at 1 C charge/discharge; cycle 9 & 10 were cycled at 2 C charge/discharge; cycle 11 & 12 were cycled at 5 C charge/discharge; cycles 13-40 were cycled at 0.5 C charge/discharge. The cycle plots compare NCA88 CAM with roughly 5 nm of $Li_{2+x}C_{1-x}B_xO_3$ with x=0, x=0.15 coated using sol-gel method, and x=0.15 0.20, and 0.25 coated using spray coating method.

DETAILED DESCRIPTION

Figure 1:
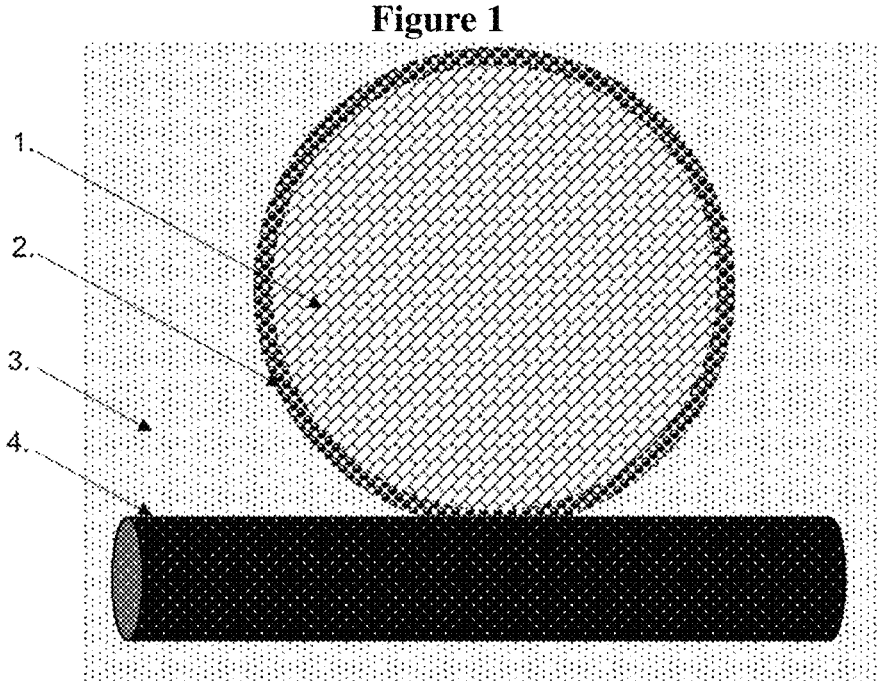
FIG. 1 shows a representative structure of a cathode layer comprising CAM particle (1), a coating around the CAM particle comprised of a thin (1-10 nm) LCBO ($Li_{2+x}C_{1-x}B_xO_3$; $0.00<x<0.5$) layer (2), an electronically conductive carbon fiber (3), and a sulfide SE (4).

In some embodiments, a cathode active material (CAM) is coated with LCBO having a formula of $Li_{2+x}C_{1-x}B_xO_3$, wherein $0<x<0.5$. Lithium carbonate borate (LCBO) is also referred as lithium carbonate doped with lithium borate. In some embodiments, the coated CAM is incorporated into a cathode layer as shown for example in FIG. 1. The cathode layer may have particles of a cathode active material (CAM) (1) coated with LCBO as a CAM coating layer (2), electrically conducting material, such as carbon fibers (3), and a solid electrolyte, such as a sulfur-containing inorganic electrolyte or sulfide based solid electrolyte (4).

In some embodiments, the CAM is at least one selected from the group consisting of $Li_xMO_2$, $Li_xNi_{1-y-z}Co_yM1_zO_2$ and $Li_xNi_{1-y-z}Mn_yM2_zO_2$, wherein M is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95 \le x \le 1.1$, $1-y-z>0$, $0<y\le0.5$, $0\le z\le0.5$.

In some embodiments, the CAM is at least one selected from the group consisting of $Li_xMO_2$, $Li_xNi_{1-y-z}Co_yM1_zO_2$ and $Li_xNi_{1-y-z}Mn_yM2_zO_2$, wherein M is at least one selected from the group consisting of Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95 \le x \le 1.1$, $1-y-z>0$, $0<y\le0.5$, $0\le z\le0.5$.

In some embodiments, the CAM is surface-doped by a doping element which is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, Si, Ge, S, P, and rare earth elements.

In some embodiments, the CAM includes without limitation: $Li_xMn_{1-y}M_yA_2$ (Formula 1), $Li_xMn_{1-y}M_yO_{2-z}X_z$ (Formula 2), $Li_xMn_2O_{4-z}X_z$ (Formula 3), $Li_xMn_{2-y}M_yA_4$ (Formula 4), $Li_xCo_{1-y}M_yA_2$ (Formula 5), $Li_xCo_{1-y}M_yO_{2-z}X_z$ (Formula 6), $Li_xNi_{1-y}M_yA_2$ (Formula 7), $Li_xNi_{1-y}M_yO_{2-z}X_z$ (Formula 8), $Li_xNi_{1-y}Co_yO_{2-z}X_z$ (Formula 9), $Li_xNi_{1-y-z}Co_yM_zA_a$, (formula 10), $Li_xNi_{1-y-z}Co_yM_zO_{2-a}X_a$ (Formula 11), $Li_xNi_{1-y-z}Mn_yM_zA_a$ (Formula 12), $Li_xNi_{1-y-z}Mn_yM_zO_{2-a}X_a$ (Formula 13), $Li_xNi_{1-y-z}Mn_yM_zO_2$ (Formula 14) and combinations thereof wherein $0.95 \le x \le 1.1$, $0 \le y \le 0.5$, $0 \le z \le 0.5$, $0 \le a \le 2$; M is selected from the group consisting of Al, Ni, Co, Mn, Cr, Fe, Mg, Sr, V, and rare earth elements; A is selected from the group consisting of O, F, S, and P; and X is selected from the group consisting of F, S, and P. In some embodiments, the CAM is in the form of particles having an average diameter in a range from about 1 μm, about 1 μm to about 15 μm, about 1 μm to about 12 μm, about 1 μm to about 10 μm, about 1 μm to about 7 μm, about 1 μm to about 6 am, about 3 μm to about 15 μm, about 3 μm to about 12 μm, about 3 μm to about 10 μm, about 3 μm to about 7 μm, about 3 μm to about 6 μm, about 5 μm to about 15 μm, about 5 μm to about 12 μm, about 5 μm to about 10 μm and all ranges and subranges therebetween. In some embodiments, the coated CAM may have a concentration in a range from about 50 wt % to about 99 wt %, about 50 wt % to about 95 wt %, about 50 wt % to about 90 wt %, about 50 wt % to about 85 wt %, about 50 wt % to about 80 wt %, about 55 wt % to about 99 wt %, about 55 wt % to about 95 wt %, about 55 wt % to about 90 wt %, about 55 wt % to about 85 wt %, about 55 wt % to about 80 wt %, about 60 wt % to about 99 wt %, about 60 wt % to about 95 wt %, about 60 wt % to about 90 wt %, about 60 wt % to about 85 wt %, about 60 wt % to about 80 wt %, about 65 wt % to about 99 wt %, about 65 wt % to about 95 wt %, about 65 wt % to about 90 wt %, about 65 wt % to about 85 wt %, about 65 wt % to about 80 wt %, about 70 wt % to about 99 wt %, about 70 wt % to about 95 wt %, about 70 wt % to about 90 wt %, about 70 wt % to about 85 wt %, about 70 wt % to about 80 wt %, and all range and subranges therebetween in the cathode layer. In some embodiments, the CAM particles may be polycrystalline or single crystalline. In some embodiments, the CAM particles may have a single particle size distribution or multiple particle size distributions.

In some embodiments, the CAM contains element Ni with a molar fraction of at least 50%, at least 55%, at least 60%, at least 65%, at least 70%, at least 75%, at least 80%, or at least 85% in all metal elements other than lithium.

In some embodiments, the cathode coating material is a $Li_3BO_3$ doped $Li_2CO_3$ (LCBO), where the ratio of $Li_2CO_3$—$Li_3BO_3$ is expressed as $Li_{2+x}Cl_xB_xO_3$. In some embodiments, $0<x<1$, $0<x\le0.90$, $0<x\le0.80$, $0<x\le0.70$, $0<x\le0.60$, $0<x\le0.50$, $0<x\le0.45$, $0<x\le0.40$, $0<x\le0.35$, $0<x\le0.30$, $0<x\le0.25$, $0<x\le0.20$, $0<x\le0.15$, $0<x\le0.10$, $0.10<x\le1$, $0.10<x\le0.90$, $0.10<x\le0.80$, $0.10\times0.70$, $0.10<x0.60$, $0.10<x0.50$, $0.10\le x\le0.45$, $0.10<x\le0.40$, $0.10<x\le0.35$, $0.10<x\le0.30$, $0.10<x\le0.25$, $0.10<x\le0.20$, $0.15<x\le1$, $0.15<x\le0.90$, $0.15<x\le0.80$, $0.15<x\le0.70$, $0.15<x\le0.60$, $0.15<x\le0.50$, $0.15<x<0.45$, $0.15<x\le0.40$, $0.15<x\le0.35$, $0.15<x\le0.30$, $0.15<x\le0.25$, $0.20<x\le1$, $0.20<x\le0.90$, $0.20<x\le0.80$, $0.20\le x\le0.70$, $0.20\le x\le0.60$, $0.20<x\le0.50$, $0.20<x\le0.45$, $0.20<x\le0.40$, $0.20\le x\le0.35$, $0.20\le x\le0.30$, $0.25<x\le1$, $0.25<x\le0.90$, $0.25<x\le0.80$, $0.25<x\le0.70$, $0.25\le x\le0.60$, $0.25\le x\le0.50$, $0.25<x\le0.45$, $0.25<x\le0.40$, $0.25\le x\le0.35$, $0.30\le x\le1$, $0.30\le x\le0.90$, $0.30\times0.80$, $0.30\le x\le0.70$, $0.30\le x\le0.60$, $0.30\le x<0.50$, $0.30\le x\le0.45$, $0.30\le x\le0.40$, $0.35$ $x\le1$, $0.35\le x\le0.90$, $0.35\le x\le0.80$, $0.35<x\le0.70$, $0.35\le x\le0.60$, $0.35\le x\le0.50$, $0.35\le x\le0.45$, $0.40\le x\le1$, $0.40\le x\le0.90$, $0.40\le x\le0.80$, $0.40\le x\le0.70$, $0.40\le x\le0.60$, $0.40\le x\le0.50$, $0.45\le x\le1$, $0.45\le x\le0.90$, $0.45\le x\le0.80$, $0.45\le x\le0.70$, $0.45\le x\le0.60$, $0.50\le x\le1$, $0.50\le x\le0.90$, $0.50\le x\le0.80$, $0.50\le x\le0.70$, $0.50\le x\le0.60$, $0.70\le x\le1$, $0.70\le x\le0.90$, $0.70\le x\le0.80$, and all ranges and subranges therebetween. The ranges for x disclosed above improve the ionic conductivity through the doping of lithium borate into the lithium carbonate, which in turn improves the discharge capacity of an all-solid-state battery. Doping lithium borate into lithium carbonate also leads to higher cycle-life stability because the B—O bonds are stronger than the C—O bonds, which leads to less O—S exchange between the cathode active material and the sulfide solid electrolyte. It has been found that doping a high amount of lithium borate into the lithium carbonate may lead to decreases in the ionic conductivity and cycle-life stability, which leads to lower discharge capacities. Without wishing to be bound by theory, the decrease in cycle-life capacity of high lithium borate doped compositions may be a result of the hardness to lithium borate (4 on the Mohs hardness scale) being higher than lithium carbonate (0.6 on the Mohs hardness scale.) The harder lithium borate coatings would be more prone to cracking during volume expansion and contraction of the cathode active material during cycling, thereby exposing the cathode active material surface to the solid electrolyte, which would lower cycle-life stability.

In some embodiments, the LCBO coating may have a thickness in a range from 0.5 to 20 nm, from 0.8 to 20 nm, from 1 to 20 nm, from 2 to 20 nm, from 4 to 20 nm, from 10 to 20 nm, from 0.5 to 10 nm, from 1.0 to 10 nm, from 2 to 10 nm, or from 4 to 10 nm. In some embodiments, the thickness is measured by observing the cross section of a dissected particle using a scanning electron microscope (SEM). In some embodiments, the thickness is measured on a transmission electron microscope (TEM). In some embodiments, the thickness is calculated by using the weight content of lithium carbonate, the content of lithium carbonate borate after doping, and the surface area (such as BET specific surface area).

In some embodiments, the electrically conductive material may be carbon fibers including but not limited to, vapor grown carbon fiber (VGCF), carbon nanotube (CNT), multi-walled carbon nanotubes (MWCNT), carbon nanofiber, and graphite fiber. In some embodiments, the electrically conductive material may have a BET measured specific surface area in a range from 1 to 600 $m^2/g$ and/or an electrical resistance of no more than 0.5 Ω·cm. In some embodiments, the electrically conductive material may be coated with an oxide material. In some embodiments, the oxide material includes without limitation lithium borates, alumina, lithium zirconate ($Li_2ZrO_3$), $LiNbO_3$, $Li_4SiO_4$, $Li_3PO_4$, $Li_2SiO_3$, $LiPO_3$, $Li_2SO_4$, $Li_2WO_4$, $Li_2MoO_4$, $LiAlO_2$, $Li_2TiO_3$, $Li_4Ti_5O_{12}$, or a composite oxide thereof. In some embodiments, the lithium borates for the electrically conductive material coating include without limitation $Li_3B_{11}O_{18}$, $Li_3BO_3$, $Li_4B_2O_5$, $Li_6B_4O_9$, $LiBO_2$, $Li_2B_4O_7$, $Li_3B_7O_{12}$, and $LiB_3O_5$. In some embodiments, the electrically conductive material (coated or uncoated) has a concentration in a range from 0.01 wt % to 5 wt %, 0.01 wt % to 4 wt %, 0.01 wt % to 3 wt %, 0.01 wt % to 2 wt %, 0.5 wt % to 5 wt %, 0.5 wt % to 4 wt %, 0.5 wt % to 3 wt %, 0.5 wt % to 2 wt %, 1 wt % to 5 wt %, 1 wt % to 4 wt %, 1 wt % to 3 wt %, 2 wt % to 5 wt %, 2 wt % to 4 wt %, and any or all ranges and subranges therebetween in the cathode layer.

In some embodiments, a method for preparing the coated cathode active materials disclosed herein can include determining a weight percentage of lithium carbonate in uncoated cathode active material, for example by using thermal gravimetric analysis (TGA) or titration. A coating solution including a solvent, a lithium precursor and a borate precursor can be prepared, wherein the amounts of the lithium precursor and borate precursor are calculated based on the formula $Li_{2+x}C_{1-x}B_xO_3$ and the weight percentage of lithium carbonate previously determined as being present in the uncoated cathode active material. In some embodiments, the solvent for preparing the coating solution is non-aqueous and is selected from the group consisting of methanol, ethanol, isopropanol, n-propanol, t-butanol, and mixtures thereof. The coating solution can be applied to the uncoated cathode active material and then the coating solution can be annealed, whereby the lithium precursor and the borate precursor are converted ion lithium carbonate doped with lithium borate and forms the coating on the cathode active material. In some embodiments, the annealing occurs in a range from 150 to 600° C. for a duration in a range from 0.5 to 3 hr under an oxygen atmosphere. In some embodiments, the coating solution may be applied by spray coating the coating solution onto the uncoated cathode active material, referred to herein as a spray coating method. In other embodiments, the coating solution may be applied by mixing the uncoated cathode active material with the coating solution to form a mixture, which may then be formed into a gel by removing the solvent by vacuum, referred to herein as a sol-gel method.

In some embodiments, the solid electrolyte used may be any sulfide solid electrolyte as long as it contains Li and S and has a desired lithium-ion conductivity. The sulfide solid electrolyte may be any crystalline material, glass ceramic, and glass. In some embodiments, the solid electrolyte is a lithium-phosphate-sulfur (LPS) electrolyte. Examples of the sulfide solid electrolyte include $Li_2S$—$P_2S_5$, $Li_2S$—$P_2S_5$—LiHa ("Ha" is one or more halogen elements), $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, and $Li_{7-x}PS_{6-x}Ha_x$ (argyrodite-type solid electrolyte, "Ha" is one or more halogen elements, where $0.2 \leq x \leq 1.8$). In some embodiments, sulfide solid electrolyte may have a concentration of in a range from 1 wt % to 35 wt %, 1 wt % to 30 wt %, 1 wt % to 25 wt %, 1 wt % to 20 wt %, 1 wt % to 15 wt %, 1 wt % to 10 wt %, 5 wt % to 35 wt %, 5 wt % to 30 wt %, 5 wt % to 25 wt %, 5 wt % to 20 wt %, 5 wt % to 15 wt %, 10 wt % to 35 wt %, 10 wt % to 30 wt %, 10 wt % to 25 wt %, 10 wt % to 20 wt %, 15 wt % to 35 wt %, 15 wt % to 30 wt %, 15 wt % to 25 wt %, 20 wt % to 30 wt % and any and all ranges and subranges therebetween in the cathode layer.

In some embodiments, the cathode layer is sandwiched between a cathode current collector and the solid electrolyte layer. In some embodiments, the cathode layer includes a cathode active material (CAM) that requires both lithium ion ($Li^+$) and electron (e−) connectivity with the solid electrolyte layer and current collector, respectively. The $Li^+$ connectivity is mainly provided by small particles of sulfide-based solid electrolyte in the cathode layer, and the e− connectivity is mainly provided by the electrically conductive material. The sulfide-based solid electrolytes (such as the exemplary sulfide solid electrolyte set forth above) have a high $Li^+$ conductivity. However, they generally degrade at potentials below 1.7 V or above 2.1 V vs. $Li/Li^+$ at the CAM/SE, CF/SE, and current collector/SE interface. The degraded byproducts generally have a lower $Li^+$ conductivity, which in return requires a higher percentage of SE in the cathode composite layer, leading to a lower percentage of CAM. Without wishing to be bound by theory, the LCBO coating disclosed herein prolongs the time for degradation, maintains a relatively higher $Li^+$ conductivity, and thus improves the cycling performance.

Figure 2:
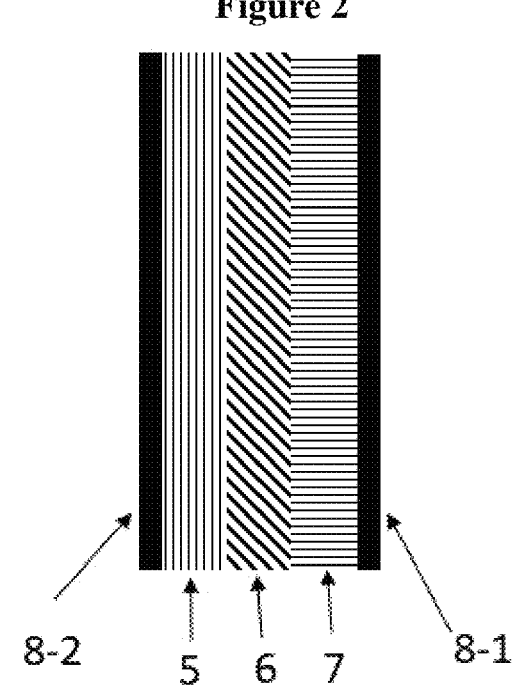
FIG. 2 shows a typical structure of an all-solid-state battery (ASSB) comprising a cathode layer (5), a solid electrolyte (6), an anode layer (7), a first current collector (8-1) in contact with the anode layer, and a second current collector (8-2) in contact with the cathode layer.
Figure 3:
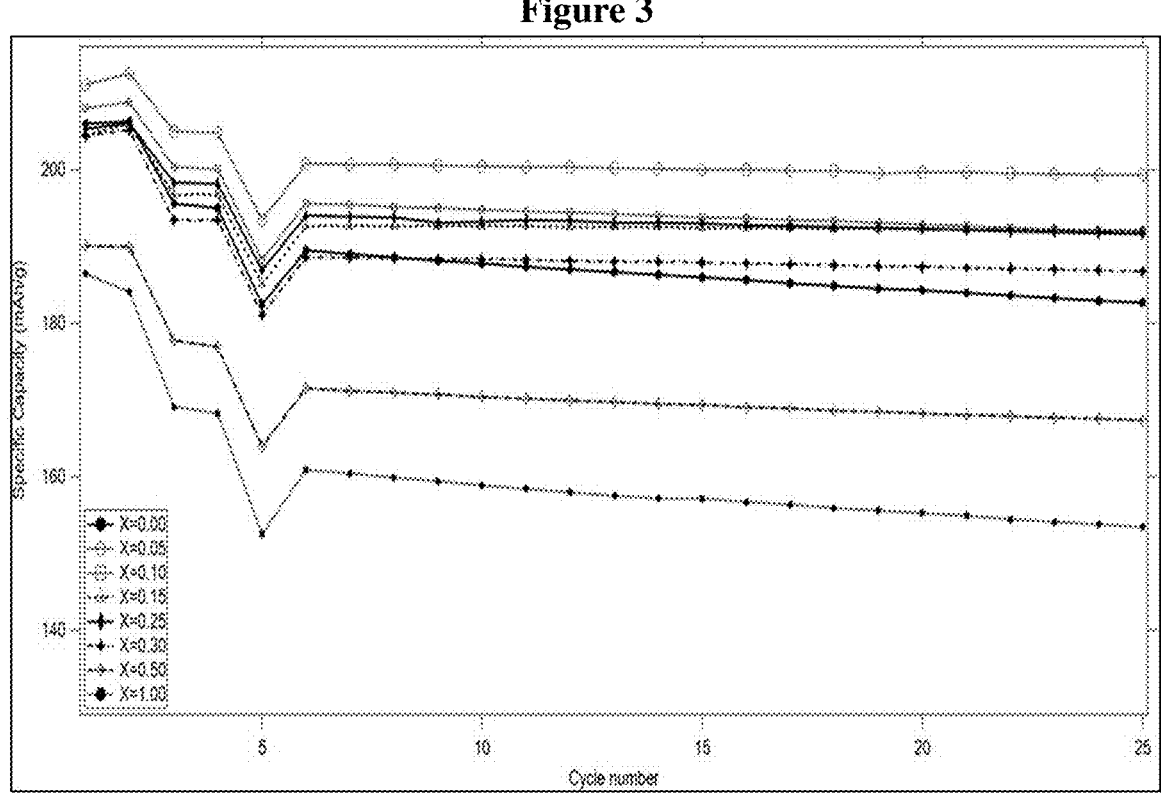
FIG. 3 shows a plot of specific capacity vs. cycle of half-cells comprising a Li metal anode, LPSCl ($Li_6PS_5Cl$) SE, and cathode layer comprising particles of NCA88 ($LiNi_{0.88}Co_{0.09}Al_{0.03}O_2$) as CAM, and vapor grown carbon fiber (VGCF). Cycle 1 & 2 are cycled at 0.1 C charge/discharge; cycle 3 & 4 are cycled at 0.33 C charge/discharge, cycle 5 is cycled at 1.0 C charge/discharge, and cycle 6-25 are cycled at 0.5 C charge/discharge. The cycle plots compare NCA88 CAM coated with roughly 5 nm of $Li_{2+x}C_{1-x}B_xO_3$ with x=0, 0.05, 0.1, 0.15, 0.25, 0.3, 0.5, and 1.

The cathode layer disclosed above can be incorporated into an all-solid-state battery. As shown for example in FIG. 2, the cathode layer 5 can act as a positive electrode in the all-solid-state battery (ASSB) and the all-solid-state-battery may also include a negative electrode (or anode layer) 7 and a solid electrolyte layer 6 between the cathode layer 5 and the negative electrode 7. In some embodiments, the solid electrolyte of the solid electrolyte layer may be the same as or different from the solid electrolyte in the cathode layer. In some embodiments, the solid electrolyte layer is an inorganic solid electrolyte layer, for example a sulfur-containing inorganic electrolyte including, but not limited to $Li_2S$—$P_2S_5$, $Li_2S$—$P_2S_5$—LiHa ("Ha" is one or more halogen elements), $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, and $Li_{7-x}PS_{6-x}H_ax$ (argyrodite-type solid electrolyte, "Ha" is one or more halogen elements, where $0.2 \leq x \leq 1.8$).

In some embodiments, the ASSB has an initial discharge specific capacity of at least 180 mAh/g, at least 185 mAh/g, or at least 190 mAh/g at a discharge rate of 0.5 C at 45° C.

In some embodiments, the ASSB has an initial discharge specific capacity of at least 190 mAh/g, at least 195 mAh/g, at least 200 mAh/g, or at least 205 mAh/g at a discharge rate of 0.1 C at 45° C.

In some embodiments, when the ASSB is charged and discharged for 20 cycles at 45° C. wherein each cycle charges to 4.25V and discharges to 2.8V at 0.1 C for cycles 1 and 2, 0.33 C for cycles 3 and 4, 1.0 C for cycle 5, and 0.5 C for cycles 6 to 20, the ASSB has a 20 cycle discharge of at least 180 mAh/g, at least 185 mAh/g, or at least 190 mAh/g and/or a $20^{th}$ cycle life retention rate of at least 95%, at least 96%, at least 97% or at least 98%. The $20^{th}$ cycle life retention rate is the ratio of the discharge specific capacity at the $20^{th}$ cycle to the initial discharge specific capacity at 0.5 C at 45° C.

In one embodiment, the present disclosure provides a layer of cathode for an all-solid-state battery, wherein the layer comprises a cathode active material (CAM) coated with LCBO. In one embodiment, the LCBO is formed between the lithium carbonate on CAM particle surface and a lithium borate or its precursors. In some embodiments, the lithium borate for doping lithium carbonate on CAM surface includes without limitation $Li_3B_{11}O_{18}$, $Li_3BO_3$, $Li_4B_2O_5$, $Li_6B_4O_9$, $LiBO_2$, $Li_2B_4O_7$, $Li_3B_7O_{12}$, and $LiB_3O_5$. In some embodiments, the lithium borate for doping lithium carbonate on CAM surface is doped with a doping element. In some embodiments, the doping element is fluorine (F), sulfur (S), silicon (Si), germanium (Ge), or a mixture thereof. In some embodiments, the lithium borate includes one or more undoped or doped lithium borates as set forth above. In some embodiments, the lithium borate is structurally similar to lithium carbonate to allow formation of lithium carbonate doped with lithium borate on the surface of CAM.

In one embodiment, the present disclosure provides an all-solid-state battery (ASSB) comprising a cathode layer set forth above.

In some embodiments, the present disclosure provides a cathode active material whose surface is doped with lithium borate.

In some embodiments, the solid electrolyte layer of the ASSB is an inorganic solid electrolyte layer, for example a sulfur-containing inorganic electrolyte including, but not limited to $Li_2S$—$P_2S_5$, $Li_2S$—$P_2S_5$—LiHa ("Ha" is one or more halogen elements), $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, and $Li_{7-x}PS_{6-x}Ha_x$ (argyrodite-type solid electrolyte, "Ha" is one or more halogen elements, where $0.2 < x < 1.8$).

The disclosure will be better understood by reference to the Experimental Details which follow, but those skilled in the art will readily appreciate that the specific experiments detailed are only illustrative and are not meant to limit the disclosure as described herein, which is defined by the claims which follow thereafter.

It is to be noted that the transitional term "comprising", which is synonymous with "including", "containing" or "characterized by", is inclusive or open-ended and does not exclude additional, un-recited elements or method steps.

Example 1

As $Li_2CO_3$ is inherently on the CAM surface from standard fabrication processes, the wt % of $Li_2CO_3$ to CAM can be determined, for example, by using thermal gravimetric analysis (TGA). The stoichiometric amounts of $Li_3BO_3$ needed to create the LCBO coating is further calculated. For x=0.15 LCBO coating, the stoichiometric amounts of a Li precursor (such as lithium acetate or lithium metal) and B precursor (such as triisopropyl borate) were dissolved in a dry solvent (such as ethanol), forming a coating solution comprising the lithium precursor and borate precursor. The coating solution was added to a pre-determined amount of CAMs, calculated to give a desired $Li_3BO_3$ doping ratio from the TGA data. The mixture was stirred for 30 minutes followed by solvent removal via vacuum while being sonicated, leading to a gel of CAM coated with the Li precursor and B precursor. The gel was then annealed for 1 hour at 300° C. under an oxygen flow to form the LCBO coating layer.

The specific discharge specific capacities and cycle-life retentions of the various LCBO coating compositions for x=0 to 1.00 were summarized in Table 1. For LCBO x=1.00 (no lithium carbonate in the coating), the CAM is first annealed at 600° C. in air for 16 hours to remove the inherent $Li_2CO_3$ on the surface prior to coating with stoichiometric amounts of $Li_3BO_3$ sol-gel reagent. The cathode layer comprises 65 wt % CAM (NCA88), 5 wt % carbon fiber, and 30 wt % lithium phosphorus sulfur chloride (LPSCl) ($Li_6PS_5Cl$). The cathode layers were electrochemically evaluated in torque-cells using Li metal on copper as the anode and LPSCl ($Li_6PS_5Cl$) as the SE. The cells are cycled from 2.8V to 4.25V at 0.1 C charge/discharge for cycles 1 and 2, 0.33 C charge/discharge for cycles 3 and 4, 1.0 C charge/discharge for cycle 5, and 0.5 C charge/discharge for cycles 6 to 25.

Figure 4:
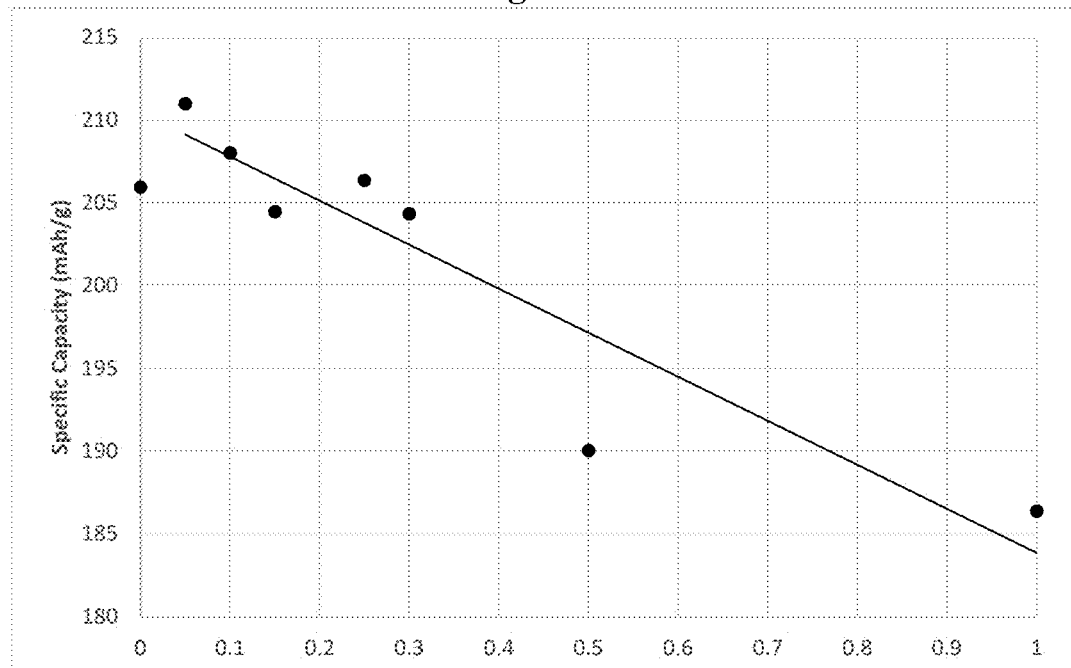
FIG. 4 shows a plot of the initial 0.1 C discharge specific capacities of 5 nm LCBO coated CAMs, x=0, 0.05, 0.1, 0.15, 0.25, 0.3, 0.5, and 1 (values from Table 1).

The LCBO coating of x=0.15 decreased the fading of the discharge specific capacity while simultaneously maintaining the initial battery performance at a high level. For example, as shown in Table 1 and FIG. 4, the initial discharge capacity is 205.95 mAh/g at a discharge rate of 0.1 C for a half-cell comprising undoped CAM (x=0.00). Doping $Li_3BO_3$ into $Li_2CO_3$ (x=0.05, 0.10, and 0.15), the initial discharge specific capacities are 211.00 mAh/g, 208.03 mAh/g, and 204.46 mAh/g, respectively. When x=1.00 (100% $Li_3BO_3$), the initial discharge capacity is decreased to 186.39 mAh/g. The LCBO coated CAM reduces cell decomposition effectively, as evident by the cycle-life capacity retention after 20 cycles at 0.5 C in Table 1 and FIG. 4, and may be crucial to realize high capacity SSBs as evident by an increase in initial discharge specific capacity at 0.1 C rate that approaches the theoretical capacity of the CAM (219.8 mAh/g for NCA88—$LiNi_{0.88}Co_{0.09}Al_{0.03}O_2$).

TABLE 1

Initial discharge (dChg.) specific capacities (mAh/g) at 45° C.
and different C-rates for half-cells using LCBO coated CAM for x = 0 – 1.

| $Li_{2+x}C_{1-x}B_xO_3$ x value | Initial Dchg 0.1 C | Initial Dchg 0.33 C | Initial Dchg 1 C | 1 C/0.33 C capacity ratio | Initial Dchg 0.5 C | 20 Cycle Dchg 0.5 C | $20^{th}$ Cycle-life Capacity Retention[a] |
|---|---|---|---|---|---|---|---|
| 0.00 | 205.95 | 195.61 | 182.53 | 93.31% | 189.53 | 181.69 | 95.87% |
| 0.05 | 211.00 | 204.92 | 193.47 | 94.41% | 200.82 | 199.26 | 99.22% |
| 0.10 | 208.03 | 200.30 | 188.25 | 93.99% | 195.58 | 192.06 | 98.21% |
| 0.15 | 204.46 | 196.68 | 185.03 | 94.08% | 192.66 | 191.94 | 99.63% |
| 0.25 | 206.37 | 194.33 | 181.36 | 93.00% | 189.21 | 187.00 | 98.83% |
| 0.30 | 204.35 | 193.48 | 181.08 | 93.59% | 188.61 | 186.80 | 99.04% |
| 0.50 | 190.06 | 177.8 | 163.97 | 92.22% | 171.53 | 167.35 | 97.57% |
| 1.00 | 186.39 | 169.22 | 152.53 | 90.14% | 160.97 | 153.47 | 95.34% |

[a]The cycle life 0.5 C dChg. Capacity retention is calculated by dividing the $20^{th}$ cycle 0.5 C dChg. Capacity by the initial 0.5 C dChg. Capacity and multiplying by 100%.

Figure 5:
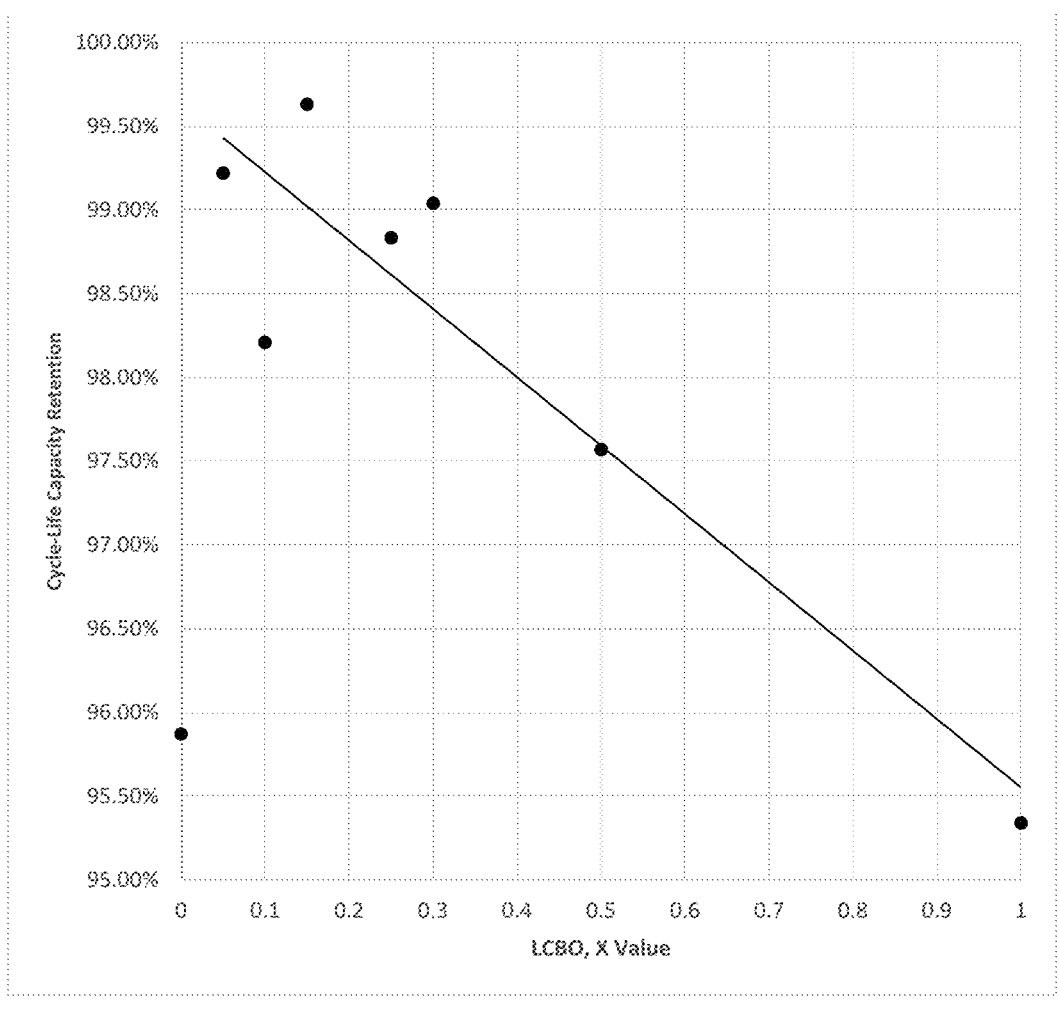
FIG. 5 shows a plot of the cycle-life capacity retention of 5 nm LCBO coated CAMs, x=0, 0.05, 0.1, 0.15, 0.25, 0.3, 0.5, and 1 (values from Table 1).

Also shown in Table 1 and FIG. 5, the cycle-life capacity retention rate is increased from 95.87% for x=0 to 99.22%, 98.21%, 99.63%, 98.83%, and 99.04% for x=0.05, 0.10, 0.15, 0.25, and 0.3, respectively. When the x is 0.5 or 1.0, the cycle-life capacity retention rate dropped to a level equivalent to or lower than the uncoated CAM (x=0). In some circumstances, when x is higher than 0.5, it may bring some benefits like short to medium-term cycle life capacity retention rate.

Figure 6:
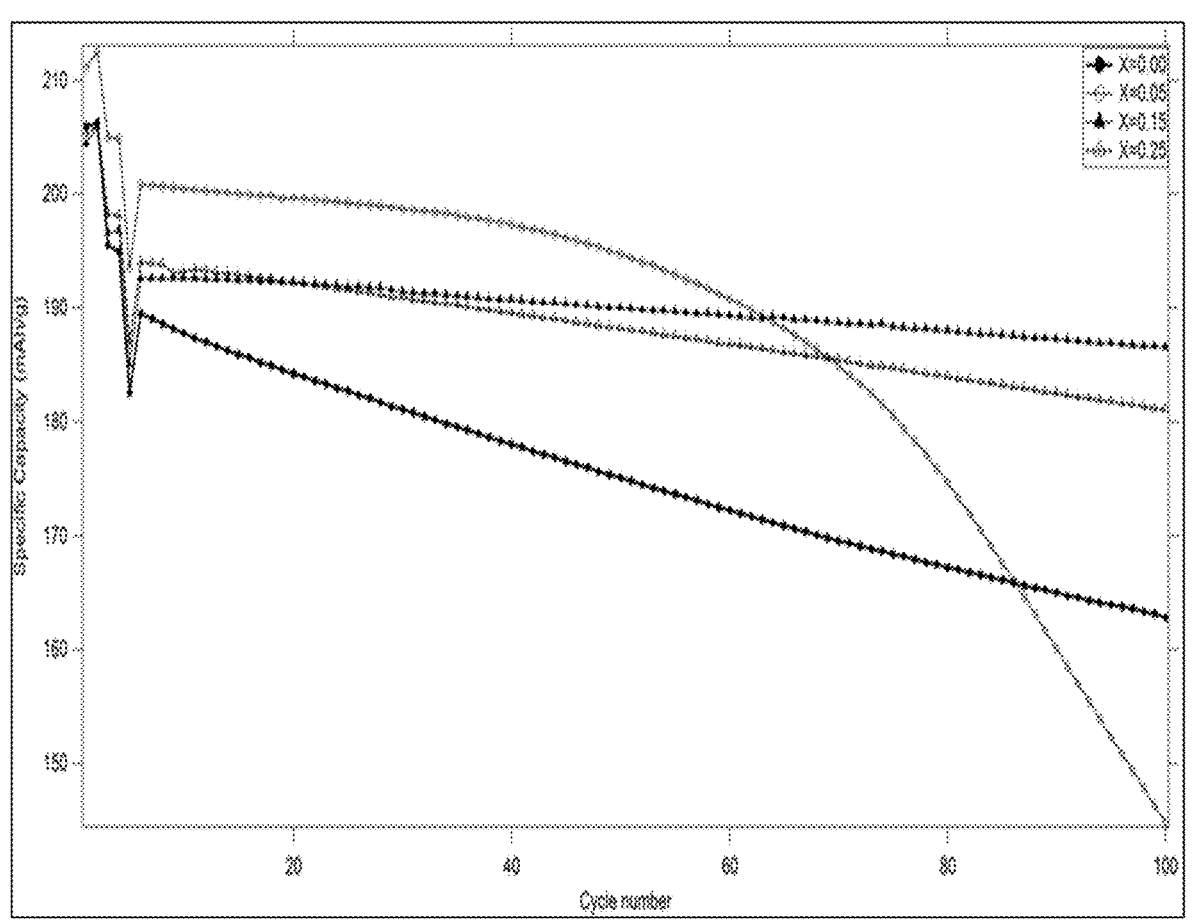
FIG. 6 shows a plot of specific capacity vs. cycle at 45° C. of half-cells comprising a Li metal anode, LPSCl ($Li_6PS_5Cl$) SE, and a cathode layer comprising particles of NCA88 ($LiNi_{0.88}Co_{0.09}Al_{0.03}O_2$) as CAM, and VGCF. Cycle 1 & 2 are cycled at 0.1 C charge/discharge; cycle 3 & 4 are cycled at 0.33 C charge/discharge, cycle 5 is cycled at 1.0 C charge/discharge, and cycle 6-100 are cycled at 0.5 C charge/discharge. The cycle plots compare NCA88 CAM coated with roughly 5 nm of $Li_{2+x}C_{1-x}B_xO_3$ with x=0, 0.05, 0.15, and 0.25.
Figure 7:
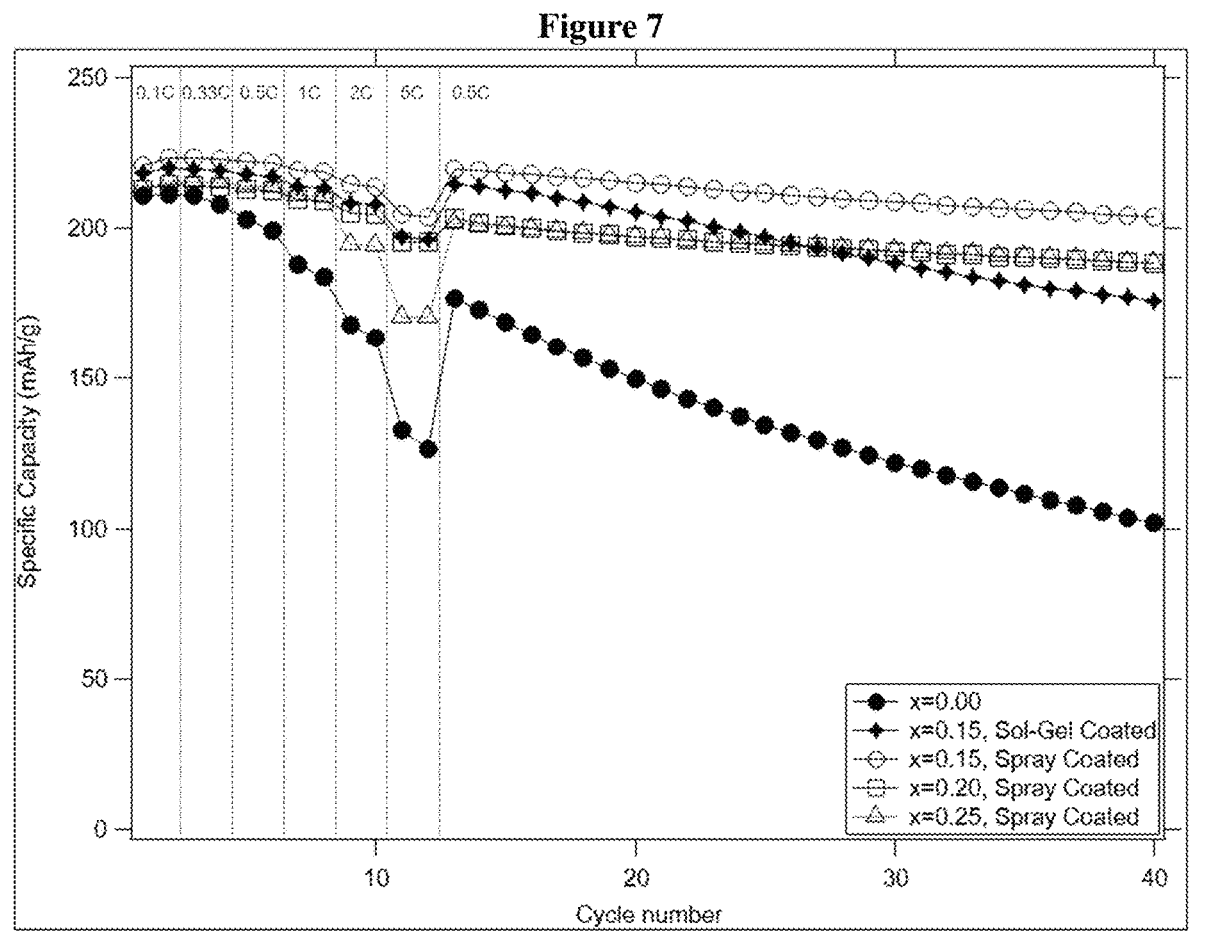

FIG. 6 is a plot of specific capacity from cycle 1 to cycle 100. It shows that x=0.05 and 0.15 have an improved cycling performance in comparison with the uncoated one (x=0). The cycling performance of x=0.25 gradually dropped to a 0.25 are shown in FIG. 7 summarized in Table 2. Comparing sol-gel and spray coated x=0.15 material, the spray coated material shows similar rate and discharge performance but higher stability, most likely due to a more even/complete coating coverage that is an inherent benefit to using the spray coating method over sol-gel. When comparing x=0.15 to 0.25 LCBO spray coated materials, the x=0.15 material showed higher rate capacities with over 200 mAh/g at 5 C charge/discharge. The x=0.25 material showed lower discharge capacities and rate capabilities but did show slight improvements in cycle-life capacity retention. All coated material showed improved performance when compared to x=0.00 CAMs.

TABLE 2

Initial discharge (dChg.) specific capacities (mAh/g) at 75° C. and different C-rates
for half-cells using NCA88 CAM with roughly 5 nm of $Li_{2+x}C_{1-x}B_xO_3$ with x = 0,
x = 0.15 coated using sol-gel method, and x = 0.15 0.20, and 0.25 coated using spray
coating method. The 0.5 C cycle-life capacity retention is calculated by dividing the $20^{th}$
cycle 0.5 C dChg. capacity by the initial 0.5 C cycling dChg. capacity and multiplying by 100%.

| $Li_{2+x}C_{1-x}B_xO_3$ x value | Initial Dchg 0.1 C | Initial Dchg 0.33 C | Initial Dchg 0.5 C | Initial Dchg 1 C | Initial Dchg 2 C | Initial Dchg 5 C | Initial Cycling Dchg 0.5 C | $20^{th}$ Cycle Dchg 0.5 C | 0.5 C Cycle-life Capacity Retention |
|---|---|---|---|---|---|---|---|---|---|
| 0.00 | 210.98 | 210.74 | 202.95 | 187.94 | 168.19 | 132.53 | 176.87 | 115.62 | 65.37% |
| 0.15[SG] | 218.19 | 219.57 | 217.76 | 213.86 | 208.36 | 197.09 | 214.57 | 180.00 | 85.75% |
| 0.15 [SC] | 220.95 | 223.43 | 222.29 | 219.29 | 214.49 | 204.62 | 219.73 | 207.27 | 94.33% |
| 0.20 [SC] | 212.98 | 214.23 | 213.01 | 209.79 | 205.22 | 195.69 | 203.41 | 191.15 | 93.97% |
| 0.25 [SC] | 213.51 | 215.30 | 214.01 | 210.75 | 194.53 | 170.67 | 201.87 | 191.24 | 94.73% |

[SG]Material coated using sol-gel method.
[SC] Material coated using spray coating method.

level lower than the uncoated one even though the specific capacity in the early cycles is higher.

Example 2

The LCBO coating was applied to the CAM surface via a spray coating method using the same method to prepare the coating solution as detailed in EXAMPLE 1. The coating solution was applied to the CAM powder using a rolling fluidized bed granulator and coater Model FD-MP-01D from Powrex Corporation. The coated CAM was then annealed for 1 hour at 300° C. under an oxygen flow to form the LCBO coating layer.

0.1 C to 5 C charge/discharge specific capacities and cycle-life retentions of the LCBO coating compositions for x=0.00, x=0.15 via sol-gel method, and x=0.15, 0.20, and In a first aspect of the disclosure, a coated cathode active material comprises a cathode active material (CAM) and a coating in contact with the cathode active material, wherein the coating comprises a lithium carbonate doped with lithium borate (LCBO) having a formula of $Li_{2+x}C_{1-x}B_xO_3$, wherein 0<x<0.5.

In a second aspect according to the first aspect, the coating has a thickness in a range from 0.5 to 20 nm.

In a third aspect according to any preceding aspect, $0.00 \leq x \leq 0.30$.

In a fourth aspect according to any preceding aspect, the cathode active material is in the form of particles and have an average diameter of 1-15 µm.

In a fifth aspect according to any preceding aspect, the CAM is at least one selected from the group consisting of $Li_xMO_2$, $Li_xNi_{1-y-z}Co_yM1_zO_2$ and $Li_xNi_{1-y-z}Mn_yM2_zO_2$, wherein M is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95 \le x \le 1.1$, $1-y-z > 0$, $0 < y \le 0.5$, $0 \le z \le 0.5$.

In a sixth aspect, the CAM is at least one selected from the group consisting of $Li_xMO_2$, $Li_xNi_{1-y-z}Co_yM1_zO_2$ and $Li_xNi_{1-y-z}Mn_yM2_zO_2$, wherein M is at least one selected from the group consisting of Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95 \le x \le 1.1$, $1-y-z > 0$, $0 < y < 0.5$, $0 \le z \le 0.5$.

In a seventh aspect, the CAM is surface-doped by a doping element which is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, Si, Ge, S, P, and rare earth elements.

In an eighth aspect according to any preceding aspect, the CAM contains element Ni with a molar fraction of at least 70% in all metal elements other than lithium.

In a ninth aspect according to any preceding aspect, the cathode active material is polycrystalline particles or single crystalline particles.

In a tenth aspect, a method for preparing a coated cathode active material of any preceding aspects, comprises a) determining weight percentage of lithium carbonate in uncoated cathode active material, b) preparing a coating solution comprising a solvent, a lithium precursor and a borate precursor, wherein the amounts of the lithium precursor and borate precursor are calculated based on the formula and the weight percentage of lithium carbonate from step a), c) applying the coating solution to the uncoated cathode active material, and d) annealing the coating solution, wherein the lithium precursor and the borate precursor are converted into lithium carbonate doped with lithium borate (LCBO) thereby obtaining the coated cathode active material.

In an eleventh aspect according to the tenth aspect, the weight percentage of lithium carbonate is determined using thermal gravimetric analysis (TGA) or titration.

In a twelfth aspect according to the tenth or eleventh aspects, the solvent for preparing the coating solution is non-aqueous and is selected from the group consisting of methanol, ethanol, isopropanol, n-propanol, t-butanol, and mixtures thereof.

In a thirteenth aspect according to any of the tenth through twelfth aspects, the coating solution is annealed in a range from 150 to 600° C. for a duration in a range from 0.5 to 3 hr under an oxygen atmosphere.

In a fourteenth aspect according to any of the tenth through thirteenth aspects, the applying of the coating solution comprises spraying the coating solution onto the cathode active material.

In a fifteenth aspect according to any of the tenth through thirteenth aspects, the applying of the coating solution comprises mixing the cathode active material in the coating solution.

In a sixteenth aspect, a cathode layer comprises a coated cathode active material set forth above in any of the first through seventh aspects.

In a seventeenth aspect according to the sixteenth aspect, the coated cathode active material has a weight percentage of at least 65% of the cathode layer.

In an eighteenth aspect according to the sixteenth or seventeenth aspect, the cathode layer further comprises an electrically conductive material.

In a nineteenth aspect according to the eighteenth aspect, the electrically conductive material is selected from carbon fiber, vapor growth carbon fiber, carbon nanotube, graphite fiber, and mixtures thereof.

In a twentieth aspect according to any of the sixteenth through nineteenth aspects, the cathode layer further comprises a sulfur-containing inorganic electrolyte.

In a twenty-first aspect according to the twentieth aspect, the sulfur-containing inorganic electrolyte is selected from the group consisting of $Li_2S—P_2S_5$, $Li_2S—P_2S_5—LiHa$, $Li_2S—P_2S_5—P_2O_5$, $Li_2S—Li_3PO_4—P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, $Li_{7-x}PS_{6-x}Ha_x$, and mixtures thereof wherein "Ha" is one or more halogen elements, and $0.2 < x < 1$.

In a twenty-second, an all-solid-state battery (ASSB) comprising a cathode layer set forth above in any of the sixteenth through twenty-first aspects.

In a twenty-third aspect according to the twenty-second aspect, the ASSB further comprises an inorganic solid electrolyte layer.

In a twenty-fourth aspect according to the twenty-third aspect, the inorganic solid electrolyte layer comprises a sulfur-containing inorganic electrolyte.

In a twenty-fifth aspect according to the twenty-third aspect, the sulfur-containing inorganic electrolyte is selected from the group consisting of $Li_2S—P_2S_5$, $Li_2S—P_2S_5—LiHa$, $Li_2S-P_2S_5—P_2O_5$, $Li_2S—Li_3PO_4—P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, $Li_{7-x}PS_{6-x}Ha_x$, and mixtures thereof, wherein "Ha" is one or more halogen elements, and $0.2 < x < 1$.

In a twenty-sixth aspect according to any of the twenty-second through twenty-fifth aspects, the LCBO has a formulation selected from the group consisting of $Li_{2.05}C_{0.95}B_{0.05}O_3$ (x=0.05), $Li_{2.10}C_{0.90}B_{0.10}O_3$ (x=0.10), $Li_{2.15}C_{0.85}B_{0.15}O_3$ (x=0.15), $Li_{2.25}C_{0.75}B_{0.25}O_3$ (x=0.25), and $Li_2B_{0.30}C_{0.70}B_{0.30}O_3$. (x=0.30).

In a twenty-seventh aspect according to any of the twenty-second through twenty-sixth aspects, when the ASSB is charged and discharged for 20 cycles at 45° C. from 2.8V to 4.25V at 0.1 C for cycles 1 and 2, 0.33 C for cycles 3 and 4, 1.0 C for cycle 5, and 0.5 C for cycles 6 to 20, the ASSB exhibits a $20^{th}$ cycle life retention rate of at least 98%, wherein each cycle charges to 4.25V and discharges to 2.8V, the $20^{th}$ cycle life retention rate is the ratio of the discharge specific capacity at the $20^{th}$ cycle to the initial discharge specific capacity at 0.5 C at 45° C.

In a twenty-eighth aspect according to any of the twenty-second through twenty-seventh aspects, the ASSB possesses an initial discharge specific capacity of at least 190 mAh/g at 0.1 C at 45° C.

REFERENCES

1. Zhang, et al. Achieving Both High Ionic Conductivity and High Interfacial Stability with the Li2+xC1-xBxO3 Solid- State Electrolyte: Design from Theoretical Calculations. ACS Appl. Mater. Interfaces 2020, 12, 5, 6007-6014. DOI: 10.1021/acsami.9b22185.
2. Zhang, et al. Direct Visualization of the Interfacial Degradation of Cathode Coatings in Solid State Batteries: A Combined Experimental and Computational Study. Adv. Energy Mater.2020, 10, 1903778. DOI: 10.1002/aenm.201903778.

We claim:

1. A coated cathode active material comprising:

particles of a cathode active material (CAM) comprising lithium carbonate (LCO) on the surface of the particles; and a coating coated on the particles, wherein the coating on the particles comprises a lithium carbonate borate (LCBO) having a formula of $Li_{2+x}C_{1-x}B_xO_3$, wherein $0<x\leq0.3$, the coating has a thickness in a range from 0.5 to 20 nm, and wherein the coating comprising the LCBO is prepared by:

a) applying to the particles of the CAM a coating solution comprising a nonaqueous solvent, a lithium precursor, and a borate precursor, leading to particles of the CAM coated with the lithium precursor and the borate precursor after removal of the nonaqueous solvent; and b) annealing the particles of the CAM coated with the lithium precursor and the borate precursor, wherein at least a portion of the LCO on the surface of the particles of the CAM, the lithium precursor, and the borate precursor, are converted into the LCBO, thereby obtaining particles of the CAM coated with the LCBO, wherein both the LCBO and LCO are present on the particles of the CAM.

2. The coated cathode active material of claim 1, wherein the particles have an average diameter of 1-15 μm.

3. The coated cathode active material of claim 1, wherein the CAM is selected from the group consisting of $Li_xMO_2$, $Li_xNi_{1-y-z}CO_yM1_zO_2$ and $Li_xNi_{1-y-z}Mn_yM2_zO_2$, wherein M is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95\leq x\leq1.1$, $1-y-z>0$, $0<y\leq0.5$, $0\leq z\leq0.5$.

4. The coated cathode active material of claim 1, wherein the CAM is selected from the group consisting of $Li_xMO_2$, $Li_xNi_{1-y-z}Co_yM1_zO_2$ and $Li_xNi_{1-y-z}Mn_yM2_zO_2$, wherein M is at least one selected from the group consisting of Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M1 is at least one selected from the group consisting of Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, wherein M2 is at least one selected from the group consisting of Co, Al, B, Fe, Mg, Ca, Sr, Sc, Y, Ti, Zr, V, Nb, Ta, Cr, Mo, W, Rh, Pd, Cu, Zn, Cd, Ga, In, Sn, and rare earth elements, and wherein $0.95\leq x\leq1.1$, $1-y-z>0$, $0<y\leq0.5$, $0\leq z\leq0.5$.

5. The coated active material of claim 4, wherein the CAM is surface-doped by a doping element which is at least one selected from the group consisting of Ni, Co, Mn, Al, B, Fe, Mg, Ca, Sr, Sc, Y, Ti, Zr, V, Nb, Ta, Cr, Mo, W, Rh, Pd, Cu, Zn, Cd, Ga, In, Sn, Si, Ge, S, P, and rare earth elements.

6. The coated active material of claim 1, wherein the CAM contains element Ni with a molar fraction of at least 50% in all metal elements other than lithium.

7. The coated active material of claim 1, wherein the cathode active material is polycrystalline particles or single crystalline particles.

8. A cathode layer comprising the coated cathode active material of claim 1.

9. The cathode layer of claim 8, wherein the coated cathode active material has a weight percentage of at least 65% of the cathode layer.

10. The cathode layer of claim 8, further comprising an electrically conductive material.

11. The cathode layer of claim 10, wherein the electrically conductive material is selected from carbon fiber, vapor growth carbon fiber, carbon nanotube, graphite fiber, and mixtures thereof.

12. The cathode layer of claim 8, further comprising a sulfur-containing inorganic electrolyte.

13. The cathode layer of claim 12, wherein the sulfur-containing inorganic electrolyte is selected from the group consisting of $Li_2S—P_2S_5$, $Li_2S—P_2S_5—LiHa$, $Li_2S—P_2S_5—P_2O_5$, $Li_2S—Li_3PO_4—P_2S_5$, $Li_3PS_4$, $Li_4P_2S_6$, $Li_{10}GeP_2S_{12}$, $Li_{3.25}Ge_{0.25}P_{0.75}S_4$, $Li—P_3S_{11}$, $Li_{3.25}P_{0.95}S_4$, $Li_{7-x}PS_{6-x}Ha_x$, and mixtures thereof wherein "Ha" is one or more halogen elements, and $0.2<x<1$.

14. An all-solid-state battery (ASSB) comprising the cathode layer of claim 8.

15. The ASSB of claim 14 further comprising an inorganic solid electrolyte layer.

16. The ASSB of claim 15, wherein the inorganic solid electrolyte layer comprises a sulfur-containing inorganic electrolyte.

17. The ASSB of claim 16, wherein the sulfur-containing inorganic electrolyte is selected from the group consisting of $Li_2S—P_2S_5$, $Li_2S—P_2S_5—LiHa$, $Li_2S—P_2S_5—P_2O_5$, $Li_2S—Li_3PO_4—P_2S_5$, $Li_3PS_4$, $Li_4P_2S_6$, $Li_{10}GeP_2S_{12}$, $Li_{3.25}Ge_{0.25}P_{0.75}S_4$, $Li_2P_3S_{11}$, $Li_{3.25}P_{0.95}S_4$, $Li_{7-x}PS_{6-x}Ha_x$, and mixtures thereof, wherein "Ha" is one or more halogen elements, and $0.2<x<1$.

18. The ASSB of claim 14, wherein the LCBO has a formulation selected from the group consisting of $Li_{2.05}C_{0.95}B_{0.05}O_3$, $Li_{2.10}C_{0.90}B_{0.10}O_3$, $Li_{2.15}C_{0.85}B_{0.15}O_3$, $Li_{2.25}C_{0.75}B_{0.25}O_3$, and $Li_{2.30}C_{0.70}B_{0.30}O_3$.

19. The ASSB of claim 14, wherein when the ASSB is charged and discharged for 20 cycles at 45° C. from 2.8V to 4.25V at 0.1 C for cycles 1 and 2, 0.33C for cycles 3 and 4, 1.0C for cycle 5, and 0.5 C for cycles 6 to 20, the ASSB exhibits a $20^{th}$ cycle life retention rate of at least 98%, wherein each cycle charges to 4.25V and discharges to 2.8V, and wherein the $20^{th}$ cycle life retention rate is the ratio of the discharge specific capacity at the $20^{th}$ cycle to the initial discharge specific capacity at 0.5 C at 45° C.

20. The ASSB of claim 14, where the ASSB possesses an initial discharge specific capacity of at least 180 mAh/g at 0.1 C at 45° C.

21. The coated cathode active material of claim 1, wherein the LCO is positioned between the LCBO and the surface of the CAM.

22. The coated cathode active material of claim 1, wherein the LCBO is formed between the LCO on the surface of the particles of the CAM and a lithium borate or a precursor of lithium borate.

23. A method for preparing the coated cathode active material of claim 1, comprising:

a) determining weight percentage of lithium carbonate on surface of particles of cathode active material;

b) preparing a coating solution comprising a nonaqueous solvent, a lithium precursor and a borate precursor, wherein the amounts of the lithium precursor and borate precursor are calculated based on the formula $Li_{2+x}C_{1-x}B_xO_3$, wherein $0<x\leq0.3$, and the weight percentage of lithium carbonate from step a);

c) applying the coating solution to the particles of the cathode active material, leading to particles of the CAM coated with the lithium precursor and the borate precursor after removal of the nonaqueous solvent; and d) annealing the particles of the CAM coated with the lithium precursor and the borate precursor, wherein the lithium carbonate on surface of particles of cathode active material, the lithium precursor and the borate precursor are converted into lithium carbonate doped with lithium borate (LCBO) thereby obtaining the coated cathode active material.

24. The method of claim 23, wherein the weight percentage of lithium carbonate is determined using thermal gravimetric analysis (TGA) or titration.

25. The method of claim 23, wherein the nonaqueous solvent for preparing the coating solution is non-aqueous and is selected from the group consisting of methanol, ethanol, isopropanol, n-propanol, t-butanol, and mixtures thereof.

26. The method of claim 23, wherein the coating solution is annealed in a range from 150 to 600° C. for a duration in a range from 0.5 to 3 hr under an oxygen atmosphere.

27. The method of claim 23, wherein applying the coating solution comprises spray coating the coating solution onto surface of the cathode active material.

28. The method of claim 23, wherein applying the coating solution comprises mixing the particles of the cathode active material with the coating solution.

* * * * *